US008958413B2

(12) United States Patent
Lee

(10) Patent No.: US 8,958,413 B2
(45) Date of Patent: Feb. 17, 2015

(54) IP-PBX SYSTEM AND METHOD FOR LINKING VOIP TERMINAL THEREWITH

(75) Inventor: Sung-Woo Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2225 days.

(21) Appl. No.: 11/705,110

(22) Filed: Feb. 12, 2007

(65) Prior Publication Data

US 2007/0206585 A1    Sep. 6, 2007

(30) Foreign Application Priority Data

Feb. 20, 2006 (KR) .................. 10-2006-0016452

(51) Int. Cl.
| H04L 12/66 | (2006.01) |
| H04M 3/42 | (2006.01) |
| H04M 7/00 | (2006.01) |
| H04L 29/06 | (2006.01) |
| H04W 4/00 | (2009.01) |
| H04J 3/24 | (2006.01) |
| H04L 12/28 | (2006.01) |
| H04L 12/56 | (2006.01) |

(52) U.S. Cl.
CPC .......... *H04M 3/42323* (2013.01); *H04M 7/006* (2013.01); *H04L 65/1053* (2013.01); *H04L 65/1073* (2013.01); *H04M 7/0093* (2013.01)
USPC ............ 370/352; 370/338; 370/349; 370/401

(58) Field of Classification Search
USPC .................. 370/352, 386, 465, 338, 349, 401
See application file for complete search history.

(56) References Cited

U.S. PATENT DOCUMENTS

| 2001/0026545 A1* | 10/2001 | Matsumoto et al. .......... 370/338 |
| 2001/0037339 A1* | 11/2001 | Harvey ......................... 707/102 |
| 2004/0081307 A1 | 4/2004 | Fujiwara et al. |
| 2004/0202153 A1* | 10/2004 | Koyama ....................... 370/352 |
| 2005/0083922 A1* | 4/2005 | Takai et al. ................... 370/386 |
| 2007/0121866 A1* | 5/2007 | Kniveton et al. .......... 379/201.1 |

FOREIGN PATENT DOCUMENTS

| GB | 2 381 995 | 5/2003 |
| KR | 2002-0084783 | 11/2002 |
| KR | 2003-0003409 | 1/2003 |

OTHER PUBLICATIONS

Korean Office action corresponding to Korean Patent Application No. 10-2006-0016452.
UK Search Report corresponding to UK Patent Application No. GB0703012.5, issued on May 9, 2007.
Korean Decision of Grant corresponding to Korean Patent Application No. 10-2006-0016452, issued on May 31, 2007.

* cited by examiner

*Primary Examiner* — Asad Nawaz
*Assistant Examiner* — Stephanie Chang
(74) *Attorney, Agent, or Firm* — H.C. Park & Associates, PLC

(57) ABSTRACT

An Internet protocol (IP)-private branch exchange (PBX) system and a method for linking the system with a Voice over Internet Protocol (VoIP) terminal. The IP-PBX system and method allow the VoIP terminal to be registered at an extension of the IP-PBX system, the VoIP terminal supporting a protocol, e.g., H.323 or session initiation protocol (SIP), standardized by a standardization organization, e.g., the International Telecommunication Union (ITU), the Internet Engineering Task Force (IETF), or the European Telecommunications Standards Institute (ETSI).

8 Claims, 6 Drawing Sheets

US 8,958,413 B2

IP-PBX SYSTEM AND METHOD FOR LINKING VOIP TERMINAL THEREWITH

CLAIM OF PRIORITY

This application makes reference to, incorporates the same herein, and claims all benefits accruing under 35 U.S.C. §119 from an application for INTERNET PROTOCOL PRIVATE EXCHANGE SYSTEM AND METHOD FOR LINKING VOICE OVER INTERNET PROTOCOL TERMINAL THEREOF earlier filed in the Korean Intellectual Property Office on 20 Feb. 2006 and there duly assigned Serial No. 10-2006-0016452.

BACKGROUND OF THE INVENTION

1. Field of the Invention

The present invention relates to an Internet protocol (IP)-private branch exchange (PBX) system and a method for linking the system with a Voice over Internet Protocol (VoIP) terminal.

2. Description of the Related Art

With the rapid development of the Internet, demand for various services has been continuously increasing. A typical example of a service in demand is a VoIP communication service.

In response to such demand, it became possible to use VoIP communication service on a legacy terminal of an extension of an IP-PBX based on IP.

However, the IP-PBX system has a problem in that it cannot use a VoIP terminal, such as an H.323 terminal and a SIP terminal, using VoIP protocol for VoIP communication service in the extension.

In other words, the IP-PBX system cannot use a VoIP terminal supporting a protocol, e.g., H.323 or SIP, standardized by a standardization organization, e.g., the International Telecommunication Union (ITU), the Internet Engineering Task Force (IETF), or the European Telecommunications Standards Institute (ETSI), for VoIP communication service in the extension of the IP-PBX.

When it comes to linking an IP-PBX system and a newly developed VoIP terminal, the inability of the IP-PBX system to work with a VoIP terminal using a standard protocol is a problem for the manufacturer or administrator of the IP-PBX system.

In addition, it is inconvenient for a user of a digital phone linked with an IP-PBX to input a prefix in addition to a phone number of an external SIP terminal in order to put a call through to the external SIP terminal.

SUMMARY OF THE INVENTION

It is an objective of the present invention to provide an Internet protocol (IP)-private branch exchange (PBX) system in which a Voice over Internet Protocol (VoIP) terminal operating according to a protocol standardized by a standardization organization for VoIP communication is linked at an extension of an IP-PBX, and a method for linking the system with a VoIP terminal.

According to an aspect of the present invention, there is provided a method for linking an IP-PBX system with a VoIP terminal, the IP-PBX system comprising a first database storing information on a phone number that can be registered at an extension and a second database storing information on a terminal registered at the extension, the linking method comprising the steps of: checking whether or not a phone number of a VoIP terminal included in an extension register message provided from the VoIP terminal is an extension number; and when the phone number of the VoIP terminal is an extension number, storing, in the second database, extension registration request information included in the extension register message and phone number information corresponding to the phone number of the VoIP terminal stored in the first database.

The step of checking whether or not the phone number of the VoIP terminal is an extension number may be performed by checking whether or not the phone number of the VoIP terminal is stored in the first database or whether or not the number of Via headers indicating a transmission route of the extension register message included in the extension register message is the same as a predetermined number.

The extension registration request information may comprise at least one of the phone number of the VoIP terminal, an IP address of the VoIP terminal, an extension registration maintenance period of the VoIP terminal in the IP-PBX system, and password information required for extension registration of the VoIP terminal in the IP-PBX system.

The phone number information corresponding to the phone number of the VoIP terminal stored in the first database may comprise at least one of the phone number of the VoIP terminal, a user name corresponding to the phone number of the VoIP terminal, and a password required for authentication of the VoIP terminal to access the IP-PBX system.

According to another aspect of the present invention, there is provided a method for processing a call in an IP-PBX system in which at least one digital phone and at least one VoIP terminal are linked, the IP-PBX system comprising a first database, a second database, and a third database storing information on at least one phone number that can be registered at an extension, the call processing method comprising the steps of: when a VoIP call connection message is received, checking whether or not an originating number included in the VoIP call connection message is an extension number; when the originating number included in the VoIP call connection message is an extension number, assigning a specific extension index of at least two extension indexes stored in the third database, and storing the assigned specific extension index and the originating number in the second database; and transmitting a message including the assigned specific extension index and the originating number to a terminal corresponding to a destination number included in the VoIP call connection message.

The call processing method may further comprise the steps of: when the originating number included in the VoIP call message is not an extension number, assigning a specific external line index of at least two external line indexes stored in the third database; and transmitting a message including the specific external line index and the originating number, which is not an extension number, to the terminal corresponding to the destination number included in the VoIP call connection message.

The step of checking whether or not the originating number included in the VoIP call connection message is an extension number may be performed by checking whether or not the originating number included in the VoIP call connection message is stored in the first database or whether or not the number of Via headers indicating a transmission route of the VoIP call connection message included in the VoIP call connection message is the same as a predetermined number.

According to still another aspect of the present invention, there is provided a method for processing a call in an IP-PBX system in which at least one digital phone and at least one VoIP terminal are linked, the IP-PBX system comprising a first database, a second database, and a third database storing information on at least one phone number that can be registered at an extension, the call processing method comprising the steps of: in response to an originating request for a VoIP call connection message, checking whether or not a destination number included in the VoIP call connection message is an extension number; when the destination number included in the VoIP call connection message is an extension number, assigning a specific extension index of at least two extension indexes stored in the third database, and storing the assigned specific extension index and the destination number in the second database; and transmitting a message including the assigned specific extension index and the destination number to an extension terminal corresponding to the destination number included in the VoIP call connection message.

The call processing method may further comprise the steps of: when the destination number included in the VoIP call connection message is not an extension number, assigning a specific external line index of at least two external line indexes stored in the third database; and transmitting a message including the specific external line index and the destination number, which is not an extension number, to an external terminal corresponding to the destination number included in the VoIP call connection message.

The step of checking whether or not a destination number included in the VoIP call connection message is an extension number may be performed by checking whether or not the destination number included in the VoIP call connection message is stored in the first database or whether or not the number of Via headers indicating a transmission route of the VoIP call connection message included in the VoIP call connection message is the same as a predetermined number.

According to yet another aspect of the present invention, there is provided an apparatus for linking an IP-PBX system with a VoIP terminal, comprising: a first database storing information on at least one phone number that can be registered at an extension of the IP-PBX system; a second database storing information on a terminal registered at the extension of the IP-PBX system; and a registration control module checking whether or not a phone number of a VoIP terminal included in an extension register message provided from the VoIP terminal is an extension number, and when the phone number of the VoIP terminal is an extension number, storing, in the second database, extension registration request information included in the extension register message and phone number information corresponding to the phone number of the VoIP terminal stored in the first database.

The registration control module may check whether or not the phone number of the VoIP terminal is an extension number by checking whether or not the phone number of the VoIP terminal is stored in the first database or whether or not the number of Via headers indicating a transmission route of the VoIP call register message included in the VoIP call register message is the same as a predetermined number.

According to yet another aspect of the present invention, there is provided an apparatus for processing a call in an IP-PBX system in which at least one digital phone and at least one VoIP terminal are linked, the call processing apparatus comprising: a first database storing information on at least one phone number that can be registered at an extension of the IP-PBX system; a second database storing information on a terminal registered at the extension of the IP-PBX system; a third database storing at least one extension index and at least one external line index for determining whether a VoIP call connection message received by the IP-PBX system is originated from a digital phone linked with the IP-PBX system, a VoIP terminal linked with the IP-PBX system, or a terminal not linked with the IP-PBX system; and a call control module, when the VoIP call connection message is received, checking whether or not an originating number included in the VoIP call connection message is an extension number, and when the originating number included in the VoIP call connection message is an extension number, assigning a specific extension index of at least two extension indexes stored in the third database, storing the assigned specific extension index in the second database, and transmitting a message including the assigned specific extension index and the originating number to a terminal corresponding to a destination number included in the VoIP call connection message.

When the originating number included in the VoIP call connection message is not an extension number, the call control module may assign a specific external line index of at least two external line indexes stored in the third database, and transmit a message including the specific external line index and the originating number, which is not an extension number, to the terminal corresponding to the destination number included in the VoIP call connection message.

The call control module may check whether or not the originating number included in the VoIP call connection message is an extension number by checking whether or not the originating number of the VoIP call connection message is stored in the first database or whether or not the number of Via headers indicating a transmission route of the VoIP call connection message included in the VoIP call connection message is the same as a predetermined number.

According to yet another aspect of the present invention, there is provided an apparatus for processing a call in an IP-PBX system in which at least one digital phone and at least one VoIP terminal are linked, the call processing apparatus comprising: a first database storing information on at least one phone number that can be registered at an extension of the IP-PBX system; a second database storing information on a terminal registered at the extension of the IP-PBX system; a third database storing at least one extension index and at least one external line index for determining whether a VoIP call connection message requested to be originated by the IP-PBX system will be destined for a digital phone linked with the IP-PBX system, a VoIP terminal linked with the IP-PBX system, or a terminal not linked with the IP-PBX system; and a call control module, when a destination number of the VoIP call connection message requested to be originated is an extension number, assigning a specific extension index of at least two extension indexes stored in the third database, storing the assigned specific extension index in the second database, and transmitting a message including the assigned specific extension index and the destination number to a terminal corresponding to the destination number included in the VoIP call connection message requested to be originated.

When the destination number included in the VoIP call connection message is not an extension number, the call control module may assign a specific external line index of at least two external line indexes stored in the third database, and transmit a message including the specific external line index and the destination number, which is not an extension number, to a terminal corresponding to the destination number included in the VoIP call connection message.

The call control module may check whether or not the destination number included in the VoIP call connection message is an extension number by checking whether or not the destination number included in the VoIP call connection message is stored in the first database or whether or not the number of Via headers indicating a transmission route of the VoIP call connection message included in the VoIP call connection message is the same as a predetermined number.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF EXEMPLARY EMBODIMENTS

Figure 1:
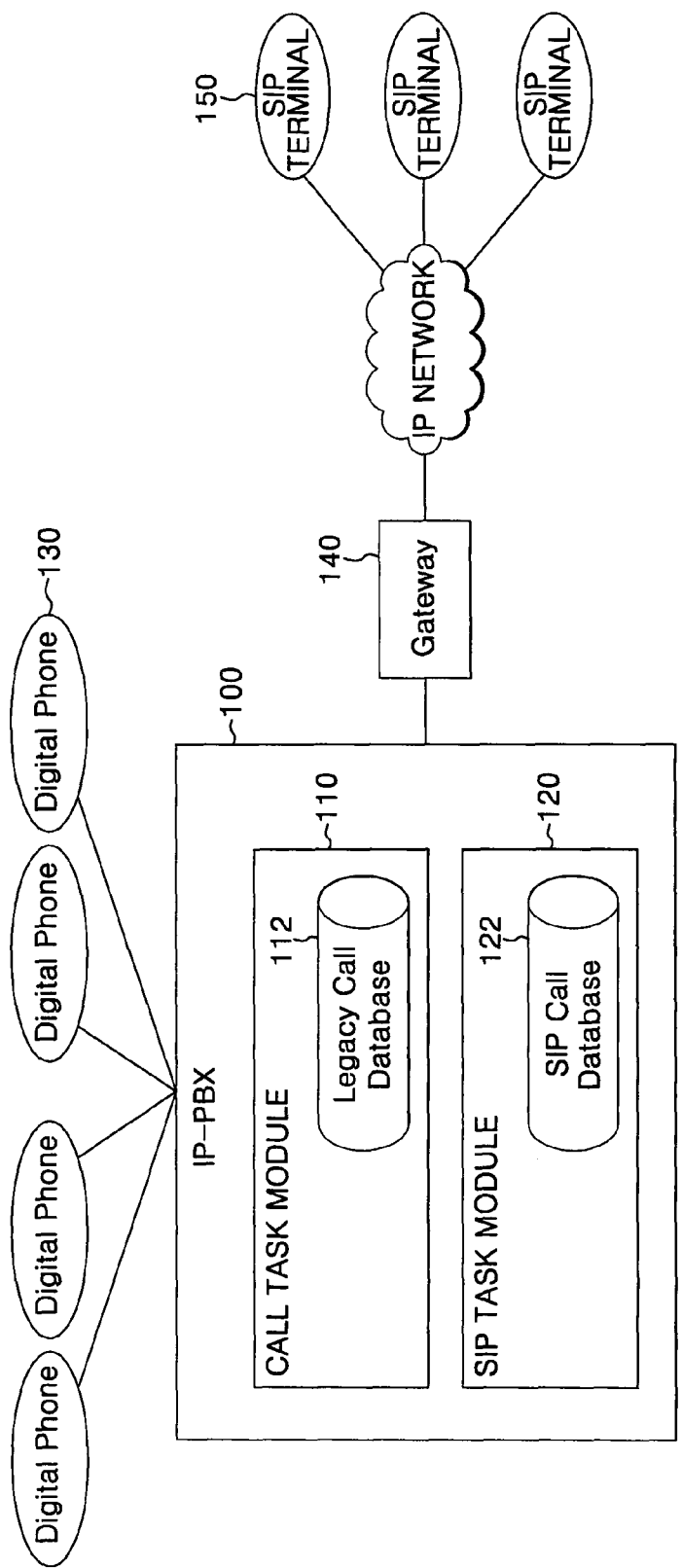
FIG. 1 is an example, in a block diagram, of a Internet protocol (IP) private branch exchange (PBX) system.

Hereinafter, exemplary embodiments of the present invention will be described in detail with reference to the accompanying drawings. In the following description, a detailed description of known functions and configurations incorporated herein has been omitted for conciseness. In addition, like elements are denoted by like reference numerals throughout the drawings to help understanding the present invention.

As illustrated in FIG. 1, an IP-PBX system comprises an IP-PBX 100, a gateway 140, and at least one session initiation protocol (SIP) terminal 150.

The IP-PBX 100 includes a call task module 110 and a SIP task module 120. The IP-PBX is linked with at least one digital phone 130.

The call task module 110 includes a legacy call database 112 storing the phone number of at least one available digital phone 130 input by an operator of the IP-PBX 100. When the digital phone 130 is connected to the IP-PBX 100, the call task module 110 assigns at least one phone number stored in the legacy call database 112.

For call connection with an external SIP terminal 150, the digital phone 130 provides the call task module 110 with a call connection message which is the phone number of the external SIP terminal 150 with a designated prefix added in front of it.

When a prefix is included in the call connection message provided from the digital phone 130, the call task module 110 provides the SIP task module 120 with the call connection message. On the contrary, when a prefix is not included in the call connection message provided from the digital phone 130, the call task module 110 attempts call connection with a digital phone having the phone number included in the call connection message.

The SIP task module 120 removes the prefix included in the call connection message provided from the call task module 110, transforms the call connection message into a SIP message, and then transmits the SIP message to an external SIP terminal at the phone number included in the call connection message from which the prefix is removed.

Meanwhile, the SIP task module 120 transforms a SIP message received through the gateway 140 for call connection between the external SIP terminal 150 and the digital phone 130 into an extension call connection message, and provides the call task module 110 with the extension call connection message.

Here, the SIP task module 120 includes a SIP call database 122 storing information on a call established between the digital phone 130 and the external SIP terminal 150.

The call task module 110 establishes a call to a digital phone 130 corresponding to a destination number included in the extension call connection message provided from the SIP task module 120.

Figure 2:
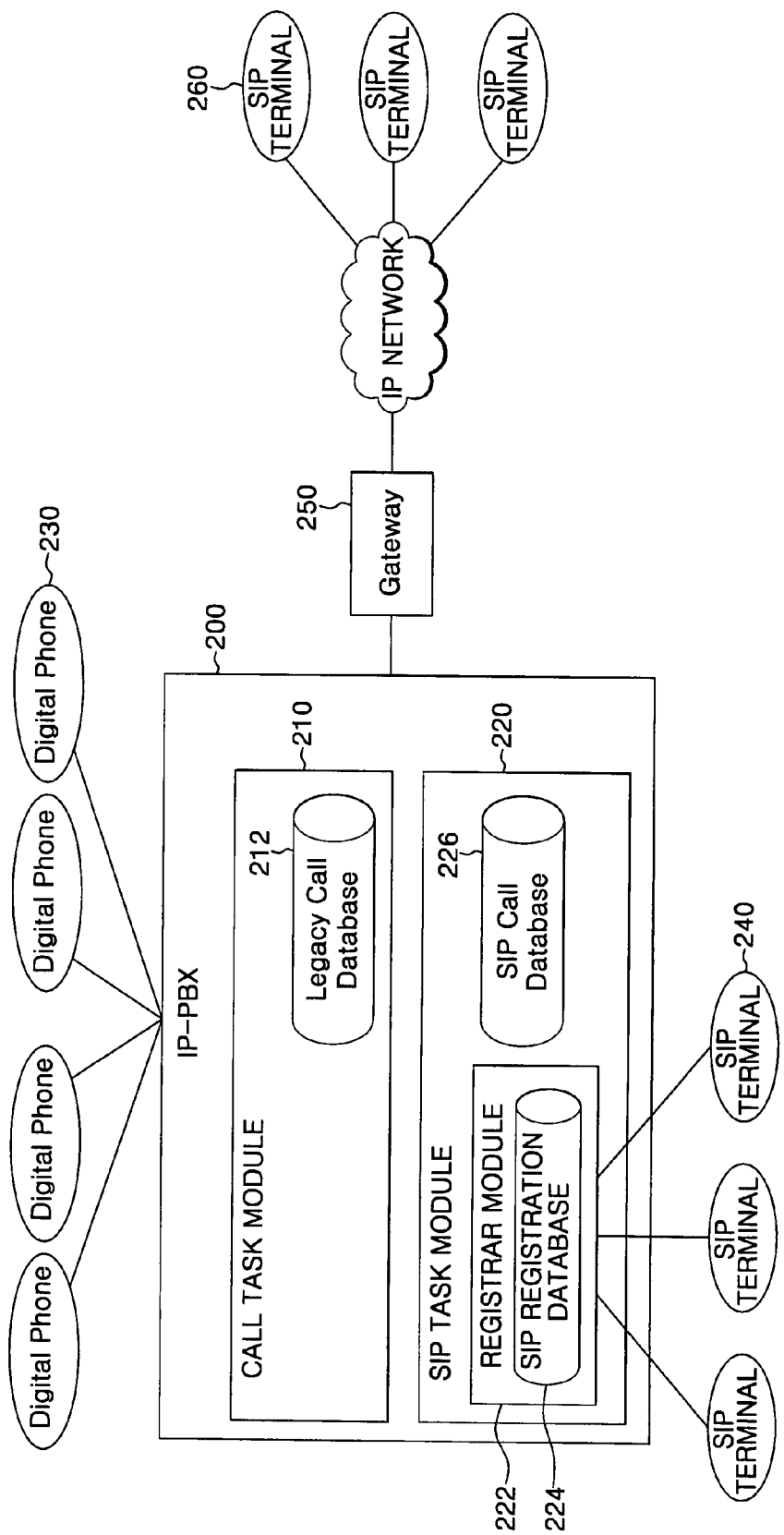
FIG. 2 is a block diagram of an IP-PBX system according to an exemplary embodiment of the present invention.

FIG. 2 is a block diagram of an Internet protocol (IP)-private branch exchange (PBX) system according to an exemplary embodiment of the present invention.

As illustrated in FIG. 2, the IP-PBX system according to the present invention comprises an IP-PBX 200, a gateway 250, and at least one session initiation protocol (SIP) terminal 260 (also known as a VoIP terminal or external VoIP terminal).

The IP-PBX 200 includes a call task module 210 and a SIP task module 220. In the IP-PBX 200, at least one digital phone 230 and at least one SIP terminal 240 (also known as a VoIP terminal) are linked.

The SIP terminal 240 provides the SIP task module 220 with a register message in order to register in the IP-PBX 200.

Here, the register message includes, but is not limited to, a phone number of the SIP terminal 240, an IP address of the SIP terminal 240, a registration maintenance period in the IP-PBX 200, and password information required for extension registration in the IP-PBX 200.

A registrar module 222 in the SIP task module 220 generates and transmits an extension number check message to the call task module 210 in order to check whether or not the phone number of the SIP terminal 240 included in the register message provided from the SIP terminal 240 corresponds to an extension number.

Here, the extension number check message includes the phone number of the SIP terminal 240 included in the register message.

The call task module 210 checks whether or not the phone number of the SIP terminal 240 included in the extension number check message provided from the SIP task module 220 is stored in a legacy call database 212.

Here, the legacy call database 212 stores, at least, one extension number that can be used in an extension of the IP-PBX 200, a user name corresponding to each extension number, a password required for authentication of the SIP terminal 240 to access the IP-PBX.

When the phone number of the SIP terminal 240 included in the extension number check message is stored in the legacy call database 212, the call task module 210 includes the phone number of the SIP terminal 240, the user name corresponding to the phone number of the SIP terminal 240, the password, etc. in an extension number confirmation message, and provides the SIP task module 220 with the extension number confirmation message.

The registrar module 222 in the SIP task module 220 generates a password using the password included in the extension number confirmation message, and checks whether or not the generated password coincides with the password included in the register message provided from the SIP terminal 240.

When the generated password coincides with the password included in the register message provided from the SIP terminal 240, the registrar module 222 in the SIP task module 220 stores in a SIP registration database 224 the phone number of the SIP terminal 240, the user name corresponding to the phone number of the SIP terminal 240, the password included in the extension number confirmation message, and the IP address of the SIP terminal 240 and the registration maintenance period of the SIP terminal 240 in the IP-PBX 200 included in the register message. In this way, extension registration for the SIP terminal 240 is completed.

After the extension registration of the SIP terminal 240 is completed, the registrar module 222 in the SIP task module 220 generates an extension registration confirmation message and provides the SIP terminal 240 with the extension registration confirmation message.

Then, the registrar module 222 in the SIP task module 220 maintains the extension registration of the SIP terminal 240 in the IP-PBX 200 for the registration maintenance period. When a register message is not provided again from the SIP terminal 240 within the registration maintenance period, the registrar module 222 removes registration information about the SIP terminal 240 in the IP-PBX 200 from the SIP registration database 224.

Meanwhile, when an invite message is received from a SIP terminal registered at the extension or an external SIP terminal, the SIP task module 220 checks whether or not an originating number included in the invite message is an extension number registered in the IP-PBX 200.

Here, the checking of whether or not the originating number included in the invite message is the extension number registered in the IP-PBX 200 may be performed by checking whether or not the originating number included in the invite message is stored in the SIP registration database 224 or whether or not a number of Via headers included in the invite message is the same as a predetermined number.

More specifically, when the originating number included in the invite message is stored in the SIP registration database 224, it is determined to be an extension number. On the contrary, when the originating number included in the invite message is not stored in the SIP registration database 224, it is determined to be a phone number of an external SIP terminal.

And, when the number of Via headers included in the invite message is 1, the originating number included in the invite message is determined to be an extension number. Otherwise, the originating number included in the invite message is determined to be a phone number of an external SIP terminal.

When the originating number included in the invite message is an extension number, the SIP task module 220 assigns a specific extension index of extension indexes assigned to extension terminals from a SIP call database 226, and records the assigned specific extension index to correspond to the extension number in the SIP registration database 224.

This is for determining whether or not an originating number included in an invite message received from a SIP terminal 240 registered at the extension terminal or an external SIP terminal 260 is an extension number registered in the IP-PBX 200 by checking the SIP registration database 224 only.

After recording the assigned specific extension index to correspond to the extension number in the SIP registration database 224, the SIP task module 220 generates a call receiving message including the assigned specific extension index and the extension number and provides the call task module 210 with the call receiving message.

Using the call receiving message provided from the SIP task module 220, the call task module 210 establishes a call to digital phone 230 or SIP terminal 240 corresponding to a destination number included in the invite message.

Meanwhile, when the originating number included in the invite message is not an extension number, the SIP task module 220 assigns a specific external line index of external line indexes assigned to external terminals from the SIP call database 226, generates a call receiving message including the assigned specific external line index and the originating number included in the invite message, and provides the call task module 210 with the call receiving message.

Using the call receiving message provided from the SIP task module 220, the call task module 210 establishes a call to digital phone 230 or SIP terminal 240 corresponding to the destination number included in the invite message.

The call task module 210 provides the SIP task module 220 with a call originating message generated from a SIP terminal registered at the extension, an external SIP terminal, or a digital phone registered at the extension.

Here, the call originating message includes information of the type of terminal originating the call (an SIP terminal registered at the extension, an external SIP terminal, or a digital phone registered at the extension).

The SIP task module 220 checks whether or not a destination number included in the call originating message is an extension number.

Here, the checking of whether or not a destination number included in the call originating message is an extension number may be performed by checking whether or not the destination number included in the call originating message is stored in the SIP registration database 224 or whether or not the number of Via headers included in the call originating message is the same as a predetermined number.

More specifically, when the destination number included in the call originating message is stored in the SIP registration database 224, it is determined to be an extension number. On the contrary, when the destination number included in the call originating message is not stored in the SIP registration database 224, it is determined to be a phone number of an external SIP terminal.

And, when the number of Via headers included in the call originating message is 1, the destination number included in the call originating message is determined to be an extension number. Otherwise, the destination number included in the call originating message is determined to be a phone number of an external SIP terminal.

When the destination number included in the call originating message is an extension number, the SIP task module 220 assigns a specific extension index of extension indexes assigned to extension terminals from the SIP call database 226, and records the assigned specific extension index to correspond to the extension number in the SIP registration database 224.

This is for determining whether or not a destination number included in a call originating message received from a SIP terminal registered at the extension, an external SIP terminal, or a digital phone registered at the extension is an extension number registered in the IP-PBX 200 by checking the SIP registration database 224 only.

After recording the assigned specific extension index to correspond to the extension number in the SIP registration database 224, the SIP task module 220 generates an invite message including the assigned specific extension index and the extension number and provides a digital phone 230 registered at the extension or a SIP terminal 240 registered at the extension with the invite message.

Preferably, when a terminal corresponding to the extension number is a SIP terminal registered at the extension, the SIP task module 220 may include an IP address of the SIP terminal, stored in the SIP registration database 224, in the invite message, and provide the SIP terminal registered at the extension with the invite message.

Meanwhile, when the destination number included in the call originating message is not an extension number, the SIP task module 220 assigns a specific external line index of external line indexes assigned to external terminals from the SIP call database 226, generates an invite message including the assigned specific external line index and the destination number included in the call originating message, and transmits the invite message to an external SIP terminal 260 through the gateway 250.

Figure 3:
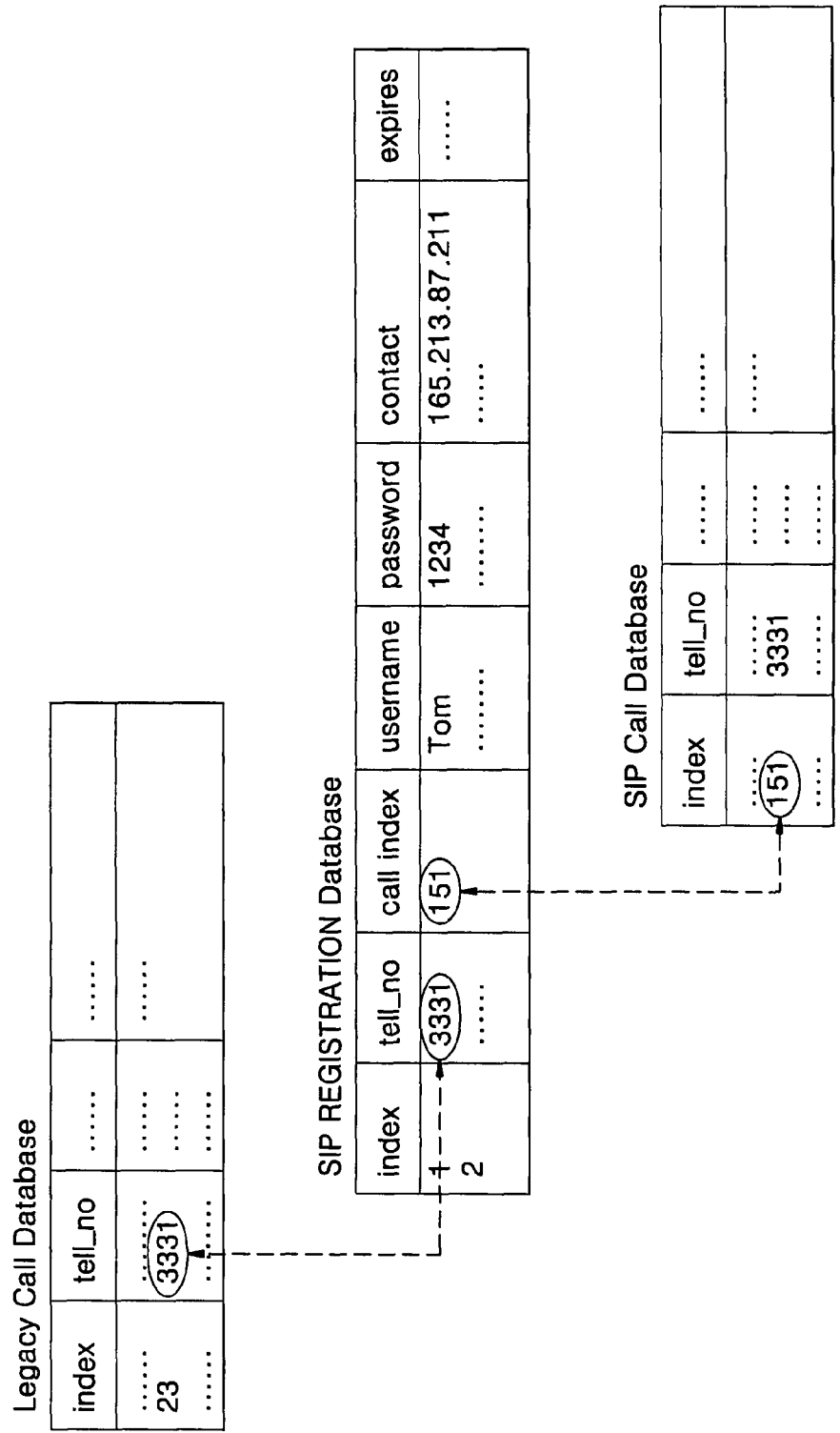
FIG. 3 illustrates the relationship between a legacy call database, a session initiation protocol (SIP) register database, and a SIP call database shown in FIG. 2.

FIG. 3 illustrates the relationship between the legacy call database, SIP registration database, and SIP call database shown in FIG. 2.

As illustrated in FIG. 3, a phone number (tell_no) "3331" that can be used as an extension number corresponding to an index (index) "23" is stored in the legacy call database.

Along with the phone number (tell_no) "3331", the SIP registration database stores an index (call index) "151", a user name (username) "Tom" of a terminal having the phone number that can be used for an extension number, a password (password) "1234", and when the terminal is a SIP terminal, an IP address (contact) "165.213.87.211" of the SIP terminal, and a registration maintenance period (expires) of the terminal in the IP-PBX.

The SIP call database stores the index (index) "151" for indicating whether or not an extension number is used, and the phone number (tell_no) "3331" corresponding to the index "151".

Figure 4:
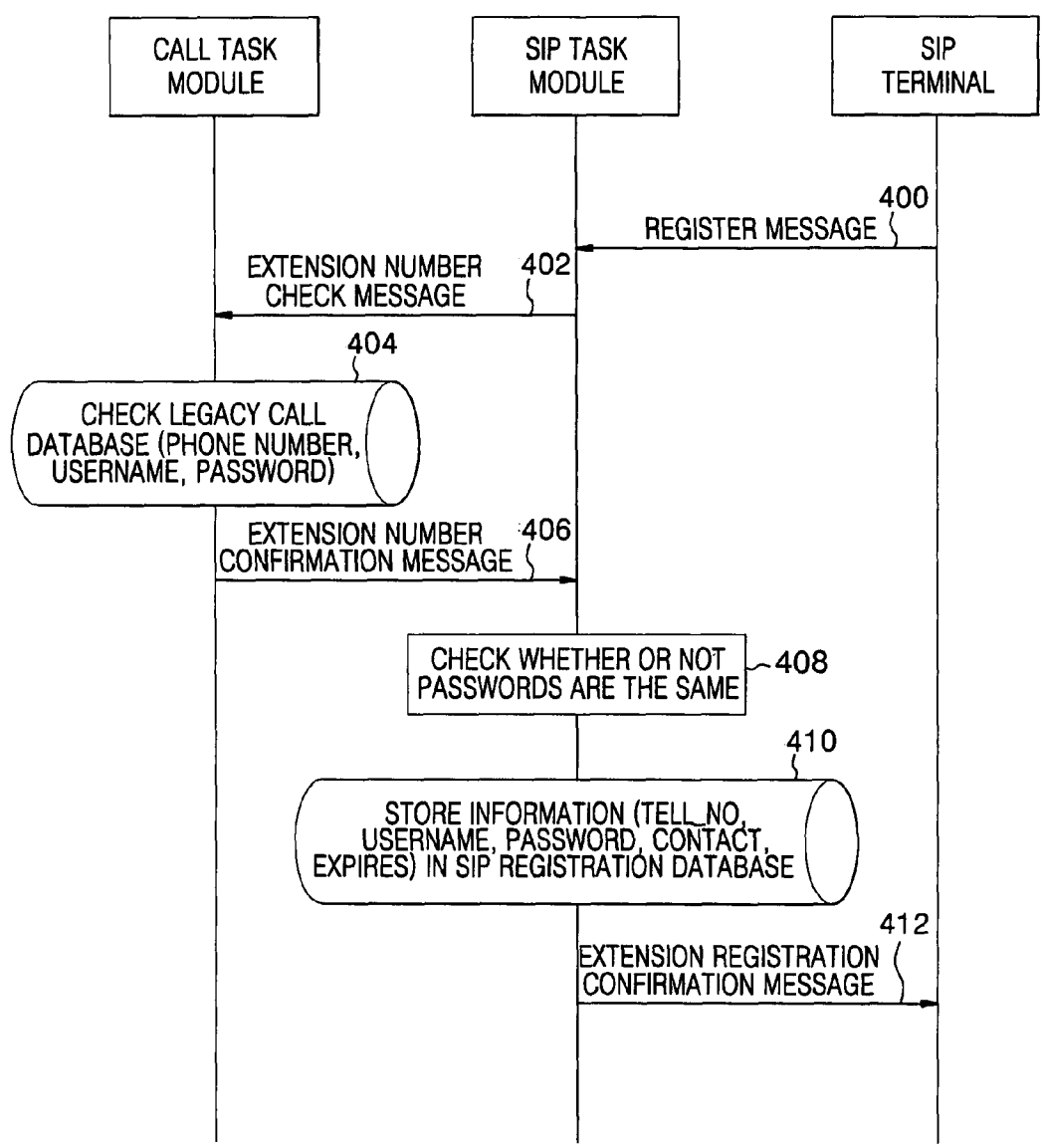
FIG. 4 illustrates a process of registering a SIP terminal in the IP-PBX system according to an exemplary embodiment of the present invention.

FIG. 4 illustrates a process of registering a SIP terminal in the IP-PBX system according to an exemplary embodiment of the present invention.

As illustrated in FIG. 4, in step 400, a SIP terminal provides the SIP task module with a register message in order to register in the IP-PBX 200.

Here, the register message includes, but is not limited to, a phone number of the SIP terminal, an IP address of the SIP terminal, a registration maintenance period in the IP-PBX, and a password information required for extension registration in the IP-PBX.

In step 402, the SIP task module generates an extension number check message and provides the call task module with the message in order to check whether or not the phone number of the SIP terminal included in the register message provided from the SIP terminal corresponds to an extension number.

Here, the extension number check message includes the phone number of the SIP terminal included in the register message.

In step 404, the call task module checks whether or not the phone number of the SIP terminal included in the extension number check message provided from the SIP task module is stored in a legacy call database (not shown in FIG. 4).

Here, when the legacy call database is the legacy call database 212 shown in FIG. 2, it has stored, but is not limited to, at least one extension number that can be used as an extension number of the IP-PBX, a user name corresponding to each extension number, and a a password required for authentication of the SIP terminal to access the IP-PBX.

When the phone number of the SIP terminal included in the extension number check message is stored in the legacy call database, the call task module includes, but is not limited to, the phone number of the SIP terminal, a user name corresponding to the phone number of the SIP terminal, and a password, in an extension number confirmation message, and provides the SIP task module with the message, in step 406.

In step 408, the SIP task module generates a password using the password included in the extension number confirmation message, and checks whether or not the generated password coincides with the password included in the register message provided from the SIP terminal.

When the generated password coincides with the password included in the register message provided from the SIP terminal, the SIP task module stores in a SIP registration database (not shown in FIG. 4) the phone number of the SIP terminal included in the extension number confirmation message, the user name (username) corresponding to the phone number of the SIP terminal, the password (password), the IP address (contact) of the SIP terminal included in the register message, and the registration maintenance period (expires) of the SIP terminal in the IP-PBX, in step 410. Through this process, extension registration of a SIP terminal in the IP-PBX is completed. Here, the SIP registration database may coincide with the SIP registration database 224 shown in FIG. 2.

After the extension registration of the SIP terminal is completed, the SIP task module generates an extension registration confirmation message and provides the SIP terminal with the message, in step 412.

Afterwards, the SIP task module maintains the extension registration of the SIP terminal in the IP-PBX for the registration maintenance period, and when a register message is not provided again from the SIP terminal within the registration maintenance period, removes extension registration information on the SIP terminal in the IP-PBX from the SIP registration database.

Figure 5:
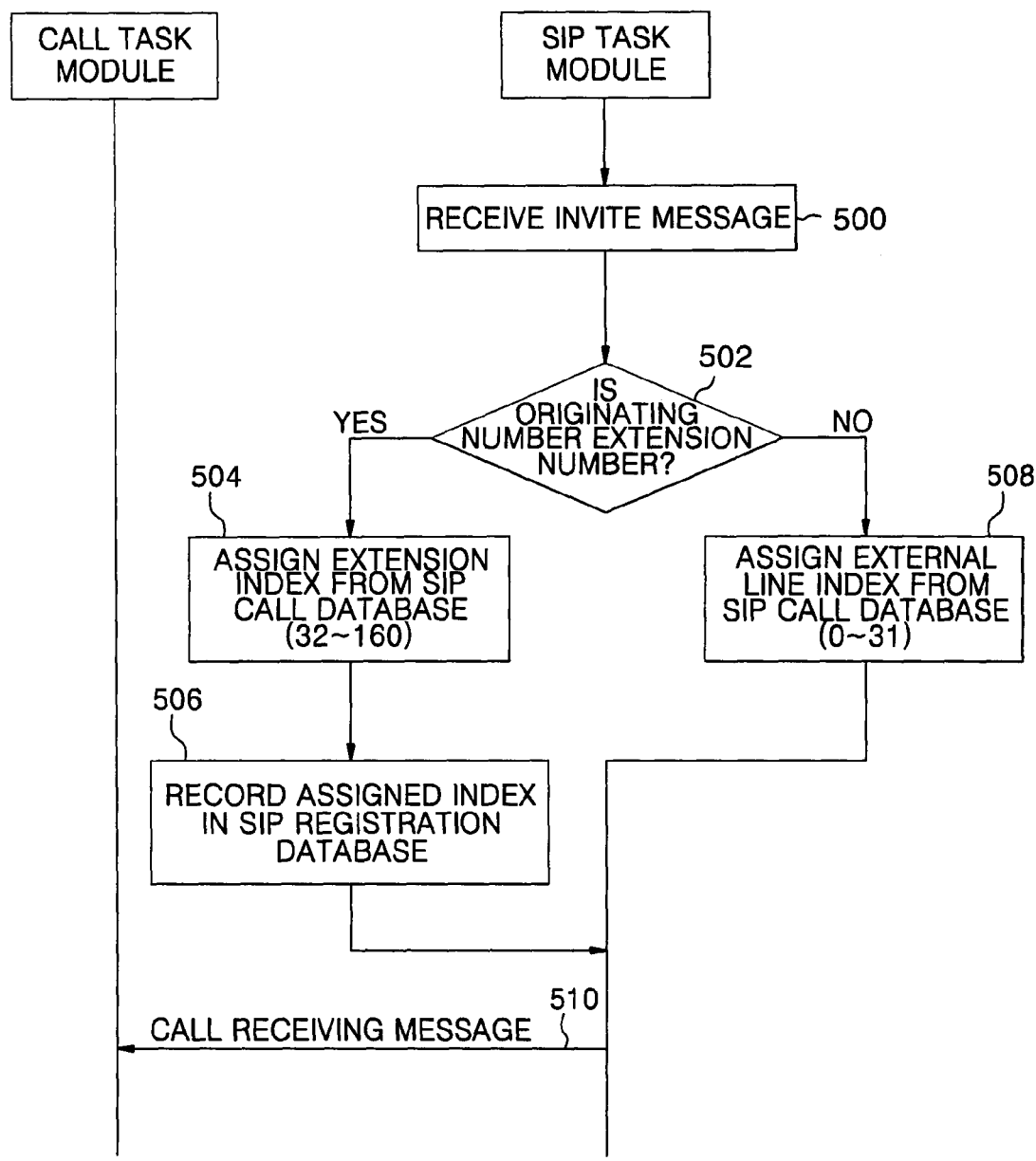
FIG. 5 is a flowchart of processing a message received by the IP-PBX system according to an exemplary embodiment of the present invention.

FIG. 5 is a flowchart of processing a message received by the IP-PBX system according to an exemplary embodiment of the present invention.

When an invite message is received from a SIP terminal registered at an extension or an external SIP terminal, the SIP task module checks whether or not an originating number included in the invite message is an extension number registered in the IP-PBX, in step 502.

Here, the checking of whether or not the originating number included in the invite message is the extension number registered in the IP-PBX maybe performed by checking whether or not the originating number included in the invite message is stored in a SIP registration database (not shown in FIG. 5) or whether or not the number of Via headers included in the invite message is the same as a predetermined number.

More specifically, when the originating number included in the invite message is stored in the SIP registration database, it is determined to be an extension number. On the contrary, when the originating number included in the invite message is not stored in the SIP registration database, it is determined to be a phone number of an external SIP terminal.

Here, the SIP registration database may be the same as the SIP registration database 224 shown in FIG. 2.

And, when the number of Via headers included in the invite message is 1, the originating number included in the invite message is determined to be an extension number. Otherwise, the originating number included in the invite message is determined to be a phone number of an external SIP terminal.

When the originating number included in the invite message is an extension number, the SIP task module assigns a specific extension index of extension indexes assigned to extension terminals from a SIP call database in step 504, and records the assigned specific extension index to correspond to the extension number in the SIP registration database in step 506.

This is for determining whether or not an originating number included in an invite message received from a SIP terminal registered at the extension or an external SIP terminal is an extension number registered in the IP-PBX by checking the SIP registration database only.

After recording the assigned specific extension index to correspond to the extension number in the SIP registration database, the SIP task module generates a call receiving message including the assigned specific extension index and the extension number and provides the call task module with the call receiving message, in step 510.

Using the call receiving message provided from the SIP task module, the call task module establishes a call to a digital phone or a SIP terminal corresponding to a destination number included in the invite message.

Meanwhile, when it is checked in step 502 that the originating number included in the invite message is not an extension number, the SIP task module assigns a specific external line index of external line indexes assigned to external terminals from the SIP call database in step 508, and then generates a call receiving message including the assigned specific external line index and the destination number included in the call originating message and provides the call task module with the call receiving message, in step 510.

Using the call receiving message provided from the SIP task module, the call task module establishes a call to a digital phone or a SIP terminal corresponding to the destination number included in the invite message.

Figure 6:
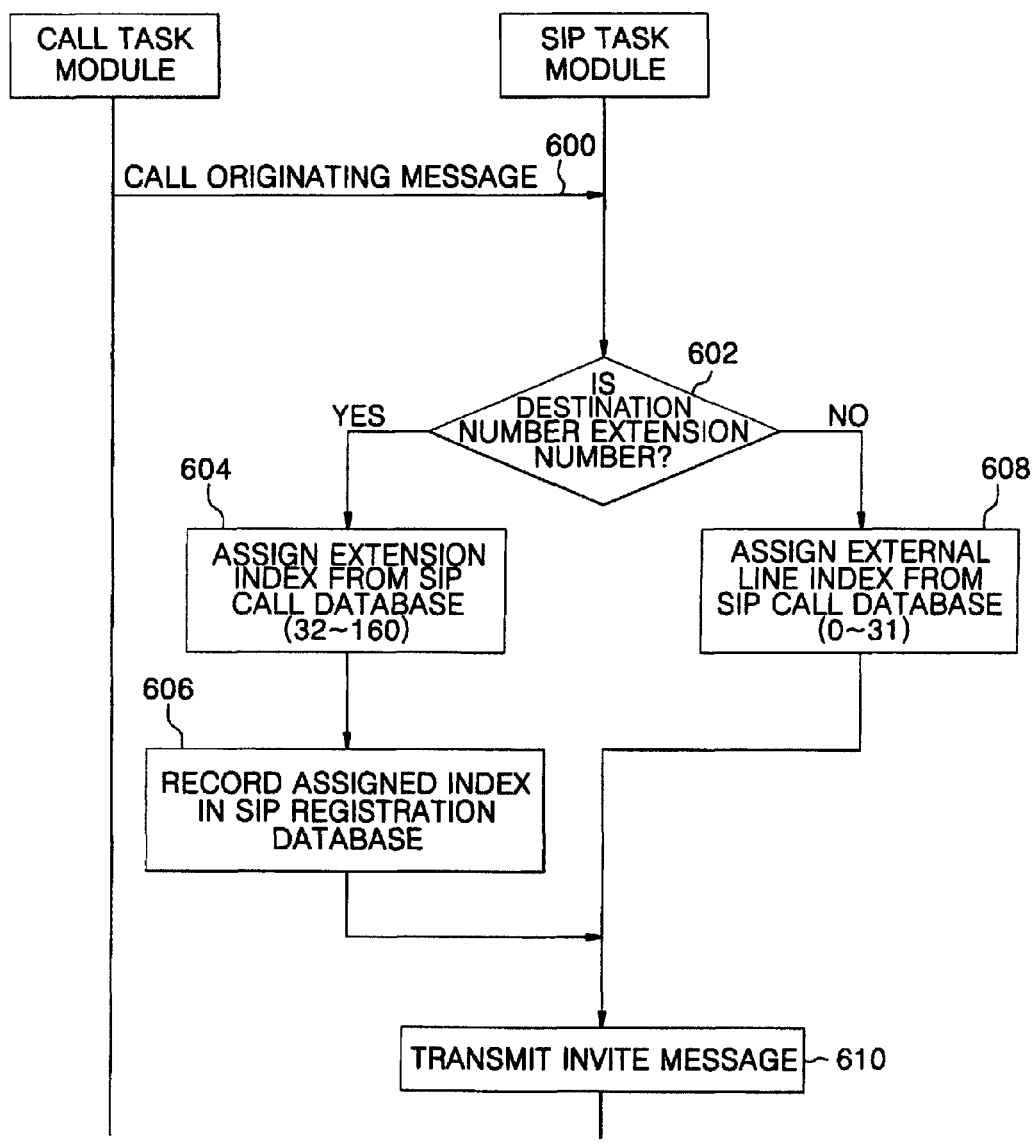
FIG. 6 is a flowchart of processing an originating message in the IP-PBX system according to an exemplary embodiment of the present invention.

FIG. 6 is a flowchart of processing an originating message in the IP-PBX system according to an exemplary embodiment of the present invention.

In step 600, the call task module provides the SIP task module with a call originating message generated from a SIP terminal registered at an extension, an external SIP terminal, or a digital phone registered at the extension.

Here, the call originating message includes information of the kind of terminal originating the call (an SIP terminal registered at the extension, an external SIP terminal, or a digital phone registered at the extension).

In step 602, the SIP task module checks whether or not a destination number included in the call originating message is an extension number.

Here, the checking of whether or not a destination number included in the call originating message is an extension number may be performed by checking whether or not the destination number included in the call originating message is stored in the SIP registration database or whether or not the number of Via headers included in the call originating message is the same as a predetermined number.

More specifically, when the destination number included in the call originating message is stored in the SIP registration database, it is determined to be an extension number. On the contrary, when the destination number included in the call originating message is not stored in the SIP registration database, it is determined to be a phone number of an external SIP terminal.

And, when the number of Via headers included in the call originating message is 1, the destination number included in the call originating message is determined to be an extension number. Otherwise, the destination number included in the call originating message is determined to be a phone number of an external SIP terminal.

When the destination number included in the call originating message is an extension number, the SIP task module assigns a specific extension index of extension indexes assigned to extension terminals from the SIP call database in step 604, and records the assigned specific extension index to correspond to the extension number in the SIP registration database in step 606.

This is for determining whether or not a destination number included in a call originating message received from a SIP terminal registered at the extension, an external SIP terminal, or a digital phone registered at the extension is an extension number registered in the IP-PBX by checking the SIP registration database only.

After recording the assigned specific extension index to correspond to the extension number in the SIP registration database, the SIP task module generates an invite message including the assigned specific extension index and the extension number and provides a digital phone registered at the extension or a SIP terminal registered at the extension with the invite message, in step 610.

Preferably, when a terminal corresponding to the extension number is a SIP terminal registered at the extension, the SIP task module may include an IP address of the SIP terminal registered at the extension stored in the SIP registration database in the invite message and provide the SIP terminal registered at the extension with the invite message.

Meanwhile, when it is checked in step 662 that the destination number included in the call originating message is not an extension number, the SIP task module assigns a specific external line index of external line indexes assigned to external terminals from the SIP call database in step 608, and then generates an invite message including the assigned specific external line index and the destination number included in the call originating message and transmits the invite message to an external SIP terminal, in step 610.

As described above, according to the IP-PBX system and the method for linking the system with a VoIP terminal (H.323 or SIP terminal), it is possible to register a VoIP terminal supporting a protocol, e.g., H.323 or SIP, standardized by a standardization organization, e.g., the International Telecommunication Union (ITU), the Internet Engineering Task Force (IETF), or the European Telecommunications Standards Institute (ETSI), at an extension of the IP-PBX system.

In addition, according to the IP-PBX system and the method for linking the system with a VoIP terminal, a user of a digital phone linked with the IP-PBX system need not input a designated prefix, only the phone number of an external SIP terminal, in order to put a call through to the external SIP terminal.

While the present invention has been described with reference to exemplary embodiments thereof, it will be understood by those skilled in the art that various changes in from and detail may be made therein without departing from the scope of the present invention as defined by the following claims.

What is claimed is:

1. A method for processing a call in an Internet protocol (IP)-private branch exchange (PBX) system in which at least one digital phone and at least one Voice over Internet Protocol (VoIP) terminal are linked, the IP-PBX system comprising a first database, a second database, and a third database, the method comprising:

receiving a VoIP call connection message;

determining whether an originating number in the VoIP call connection message is an extension number;

in response to a determination that the originating number in the VoIP call connection message is an extension number, assigning a specific extension index of at least two extension indexes stored in the third database;

in response to a determination that the originating number in the VoIP call connection message is not an extension number, assigning a specific external line index of the at least two external line indexes stored in the third database;

storing the assigned specific extension index and the originating number in the second database;

transmitting a message comprising the assigned specific extension index and the originating number to a terminal corresponding to a destination number in the VoIP call connection message; and transmitting a message comprising the specific external line index and the originating number, which is not an extension number, to the terminal corresponding to the destination number in the VoIP call connection message.

2. The method of claim 1, wherein determining whether the originating number in the VoIP call connection message is the extension number comprises determining whether the originating number in the VoIP call connection message is stored in the first database or whether a number of Via headers indicating a transmission route of the VoIP call connection message included in the VoIP call connection message is the same as a determined number.

3. A method for processing a call in an Internet protocol (IP)-private branch exchange (PBX) system in which at least one digital phone and at least one Voice over Internet Protocol (VoIP) terminal are linked, the IP-PBX system comprising a first database, a second database, and a third database, the method comprising:

receiving a VoIP call connection message;

determining whether a destination number in the VoIP call connection message is an extension number;

in response to a determination that the destination number in the VoIP call connection message is an extension number, assigning a specific extension index of at least two extension indexes stored in the third database;

in response to a determination that the destination number in the VoIP call connection message is not an extension number, assigning a specific external line index of the at least two external line indexes stored in the third database;

storing the assigned specific extension index and the destination number in the second database;

transmitting a message comprising the assigned specific extension index and the destination number to a terminal corresponding to the destination number in the VoIP call connection message; and transmitting a message comprising the specific external line index and the destination number, which is not an extension number, to an external terminal corresponding to the destination number in the VoIP call connection message.

4. The method of claim 3, wherein determining whether the destination number in the VoIP call connection message is the extension number comprises determining whether the destination number in the VoIP call connection message is stored in the first database or whether a number of Via headers indicating a transmission route of the VoIP call connection message included in the VoIP call connection message is the same as a determined number.

5. An apparatus to process a call in an Internet protocol (IP)-private branch exchange (PBX) system in which at least one digital phone and at least one Voice over Internet Protocol (VoIP) terminal are linked, the apparatus comprising:

a first database to store information on at least one phone number;

a second database to store information on a terminal registered at an extension of the IP-PBX system;

a third database to store at least one extension index and at least one external line index to determine whether a VoIP call connection message received by the IP-PBX system is received from a digital phone linked with the IP-PBX system, a VoIP terminal linked with the IP-PBX system, or a terminal not linked with the IP-PBX system; and a call control module, in response to receiving the VoIP call connection message, to determine whether an originating number in the VoIP call connection message is an extension number, and in response to a determination that the originating number in the VoIP call connection message is an extension number, to assign a specific extension index of at least two extension indexes stored in the third database, to store the assigned specific extension index in the second database, and to transmit a message comprising the assigned specific extension index and the originating number to a terminal corresponding to a destination number in the VoIP call connection message, wherein, in response to a determination that the originating number in the VoIP call connection message is not an extension number, the call control module is configured to assign a specific external line index of the at least two external line indexes and transmit a message comprising the specific external line index and the originating number, which is not an extension number, to the terminal corresponding to the destination number in the VoIP call connection message.

6. The apparatus of claim 5, wherein the call control module is configured to determine whether the originating number in the VoIP call connection message is the extension number by determining whether the originating number in the VoIP call connection message is stored in the first database or whether a number of Via headers indicating a transmission route of the VoIP call connection message included in the VoIP call connection message is the same as a determined number.

7. An apparatus to process a call in an Internet protocol (IP)-private branch exchange (PBX) system in which at least one digital phone and at least one Voice over Internet Protocol (VoIP) terminal are linked, the apparatus comprising:

a first database to store information on at least one phone number;

a second database to store information on a terminal registered at an extension of the IP-PBX system;

a third database to store at least one extension index and at least one external line index to determine whether a VoIP call connection message is to be transmitted to a digital phone linked with the IP-PBX system, a VoIP terminal linked with the IP-PBX system, or a terminal not linked with the IP-PBX system; and a call control module to determine whether a destination number in the VoIP call connection message is an extension number, and in response to a determination that the destination number in the VoIP call connection message is an extension number, to assign a specific extension index of at least two extension indexes stored in the third database, to store the assigned specific extension index in the second database, and to transmit a message comprising the assigned specific extension index and the destination number to a terminal corresponding to the destination number in the VoIP call connection message, wherein, in response to a determination that the destination number in the VoIP call connection message is not an extension number, the call control module is configured to assign a specific external line index of the at least two external line indexes stored in the third database and transmit a message comprising the specific external line index and the destination number, which is not an extension number, to an external terminal corresponding to the destination number in the VoIP call connection message.

8. The apparatus of claim 7, wherein the call control module is configured to determine whether the destination number in the VoIP call connection message is the extension number by determining whether the destination number in the VoIP call connection message is stored in the first database or whether a number of Via headers indicating a transmission route of the VoIP call connection message included in the VoIP call connection message is the same as a determined number.

* * * * *